United States Patent [19]
Flasch, Jr.

[11] Patent Number: 5,577,343
[45] Date of Patent: Nov. 26, 1996

[54] TREE PROTECTIVE MOWING TEMPLATE

[76] Inventor: Robert J. Flasch, Jr., 6310 Co Rd 18, Orland, Calif. 95963

[21] Appl. No.: 596,004

[22] Filed: Feb. 2, 1996

[51] Int. Cl.⁶ ............................................. A01G 13/00
[52] U.S. Cl. ............................... 47/33; 47/25; 47/58
[58] Field of Search ............................... 47/25, 33, 58, 47/58.01, 23, 1.01

[56] References Cited

U.S. PATENT DOCUMENTS

| | | | |
|---|---|---|---|
| 44,238 | 9/1864 | Towne | 47/23 |
| 425,890 | 4/1890 | Landis | 47/33 |
| 514,306 | 2/1884 | Clines . | |
| 1,764,442 | 6/1930 | Hansen | 47/23 |
| 3,396,488 | 8/1968 | Ries | 47/33 |
| 4,642,938 | 2/1987 | Georges | 47/25 |
| 4,845,889 | 7/1989 | Taylor . | |
| 4,934,093 | 6/1990 | Yanna | 47/33 |

FOREIGN PATENT DOCUMENTS

| | | | |
|---|---|---|---|
| 2118243 | 10/1972 | Germany | 47/33 |
| 3622427 | 1/1987 | Germany | 47/33 |

Primary Examiner—Henry E. Raduazo

[57] ABSTRACT

A mowing template for protecting tree trunks against damage from a wheeled lawnmower, and for controlling vegetation growth at the tree trunk; comprising a circular ring of opaque, tough material defining a short vertical wall having a rounded or otherwise smooth bottom edge, a smooth outer surface, and an open interior for concentric placement about a tree trunk. The ring rests encircling the tree trunk unattached to the tree or ground, and may slide on the grass and ground surface when pushed against by a lawnmower. The ring includes at least one break or split in the wall allowing opening of the ring for the initial placement about the tree, with the break being closeable and lockable. The open interior of the ring is sized in diameter relative to the diameter of the tree trunk to allow the ring to be pushed toward the tree by the lawnmower at least a distance equal to the mowing set-back of the lawnmower. The set-back of the lawnmower is defined as the distance between the outermost cutting edge of the mower blade and the outermost portion of the mower near the ground beyond the blade edge which would abut a vertical surface preventing the blade from being moved any closer to the vertical surface. Such outermost portions of the lawnmower include the wheels and the blade shroud, and it is these parts of the lawnmower which can nick, cut and bruise an unprotected tree trunk.

4 Claims, 5 Drawing Sheets

TREE PROTECTIVE MOWING TEMPLATE

BACKGROUND OF THE INVENTION

1. Field of the Invention

This invention relates to a band-like ring for serving as a mowing template and for protecting the trunks of trees from nicks, gouges and bruises from wheeled lawn mowers. Also disclosed is the use of the protective mowing template in a method of vegetation control about the trunk of a tree in a lawn setting.

2. Description of the Prior Art

There have been a variety of devices provided in the past structured for placement about a tree trunk. The majority of these devices however primarily serve to protect the trunks of the trees from boring insects and or gnawing animals, and are not structured to protect the tree from lawnmowers or grass trimmers, and do not serve as mowing templates. Most of these existing tree protectors basically include an elongated cylindrical sheath which is fitted about the trunk of the tree and secured to the ground or the tree. The sheaths are like rings or bands which fasten about the tree trunk. Since the basic purpose of these tree protectors is to prevent insects or rodents from gaining access to the bark of the tree, the upper and or lower ends of the sheaths must therefore be secured in some way to the tree and or ground. One such tree protector is described in U.S. Pat. No. 514,306, issued to P. Clines on Feb 6, 1894. Cline's device includes a tubular casing of fine mesh wire netting which extends upward at an angle from the ground to an upper section of the trunk. The upper end of the device is padded and fits closely against the tree with the lower end structured for insertion some distance below ground level to secure it in position and prevent insects from crawling under the device to gain access to the trunk.

One existing tree trunk protector which is provided as a lawn trimming shield is shown in U.S. Pat. No. 4,845,889, issued on Jul. 11, 1989 to J. W. Taylor. Taylor's device is structured of a cylindrical two-piece tube having a lengthwise hinge and openable along the opposite lengthwise side for attachment around the tree trunk. The lower edge of the shield is chamfered and supports two spikes which facilitate insertion of the lower edge into and below ground level for securing the device in place.

The existing prior art tree shields or protectors are structured to be secured stationary in position, either to the trunk of the tree or the ground adjacent the base of the tree, or to both the ground and tree. While most of these devices may, as an unintended aspect, also offer some protection for the trunks of the trees from damage from lawn mowers and grass trimmers, they are not intended to take such abuse and would more than likely either become dented or damaged themselves.

To my knowledge, all of the prior art rings, shields or bands for placement about a tree trunk, for whatever purpose, are installed in a substantially stationary manner. This stationary installation of the ring creates a problem in mowing grass closely adjacent the ring exterior surface. Since the ring is stationary, and wheeled lawnmowers all have a mowing "set-back" which limits the closeness to which a mower may cut adjacent a vertical wall or obstruction, mowing of the tall grass adjacent the exterior surface of the ring cannot be performed with a wheeled lawnmower. Thus a secondary operation such as pulling the grass by hand or using a motorized line trimmer mower must be performed to remove this tall grass. On small ornamental trees in lawns, the grass grows tall directly adjacent the tree trunk, and again, due to the lawnmower set-back, a time consuming secondary operation such as pulling the grass by hand or using a line trimmer mower must be performed to remove this tall grass adjacent the tree trunk, however the line of a motorized line trimmer can easily cut into the tree trunk and kill or stunt the growth of the tree. It should be noted that although chemical weed and grass killers may be applied to the area surrounding the tree trunk, caution must be taken to not poison the tree, and many people are simply opposed to the use of such chemicals for environmental and or safety reasons.

SUMMARY OF THE INVENTION

Although I will very specifically describe the best modes for carrying out the invention, it should be understood that some changes in the specifics given and shown in my drawings may clearly be made without departing from the true scope of the invention. The present invention is a tree trunk protective mowing template in the form of a ring shaped vertical wall for protecting tree trunks and the trunks of similar plants against damage from a wheeled lawnmower, such as a hand pushed or riding lawnmower. Also disclosed is the use of the protective mowing template in a method of vegetation control in perimeter surrounding the trunk of a tree or like vertical member extending from the ground in a lawn setting. The term "vegetation control" and very similar terms thereto is herein intended to mean control of the height of the vegetation (grass of the lawn) such as on the exterior of the ring, or the very existence of vegetation, preventing it from taking hold in the soil and growing, as in the center of the ring as will become appreciated with continued reading.

The ring (template) comprises a rigid or semi-rigid band or ring which is preferably circular in shape and made of tough impact resistant material defining a short vertical wall having a rounded or otherwise smooth bottom edge for resting against the ground. The bottom edge may be squared with radiused corners so as to not significantly catch when sliding across a surface, being able to glance over small obstructions and mature and therefore relatively tough grass which will typically exist about the exterior of the ring. The ring is preferably circular since tree trunks are circular in cross section, and as will become increasingly appreciated, the ring will move about the tree trunk more easily and smoothly, and with fewer stops or hang-ups with a smooth circular interior wall surface. The ring is for concentric or centered placement about a tree trunk in a cleared or vegetation free area, and rests horizontally encircling the tree trunk unattached to the tree or ground, and thus may slide on the grass and ground surface on its smooth bottom edge when pushed against by a lawnmower. The ring includes at least one break or transverse split in the wall allowing the opening of the ring at the split for the initial placement about the tree, with the split or break being closeable and lockable in the closed position so the ring is a close-ended continuous loop or band. The ring defines an open interior in the center of which normally resides the tree trunk. The open interior of the ring is sized relative to the diameter of the tree trunk to allow the ring to be pushed toward the tree by the lawnmower at least a distance equal to the mowing set-back of the lawnmower.

The set-back of the lawnmower is essentially defined as the distance between the outermost cutting edge of the mower blade and the outermost portion of the mower wheels or blade shroud beyond the blade edge which is near the ground, and which would abut a vertical surface preventing the blade from being moved any closer to the vertical surface. Such outermost portions of the typical lawnmower include the wheels and the shroud covering the cutting blade, and it is these parts of the lawnmower which are typically the components which can nick and cut an unprotected tree trunk during mowing closely about the tree.

A typical lawnmower set-back ranges anywhere from ½ of an inch to four inches, but could be more or less. The set-back is in part determined by the positioning of the mower, the shape and size of the vertical obstacle, and the particular shape and construction of the lawnmower. With a ring rising vertically from the ground, and with the ring being sufficiently small in diameter to somewhat fit between the two wheels on one side of the mower, then the blade shroud can be abutted against the exterior of the ring, and typically the cutting blade reaches within about ½ inch of the thin sheet metal shroud interior surface, and so in this scenario, the set-back may only be about the ½ inch distance of the blade from the interior surface of the shroud, plus the thickness of the shroud material, or about a total set-back of about ¾ of an inch. This ¾ inch set-back prevents the cutting of the grass directly adjacent exterior of the ring or the trunk of a tree if one is trying to mow right up to the tree trunk. Additionally, it should be appreciated that it is time consuming to operate the mower so accurately as to keep the exterior of the blade shroud tightly abutted against the ring to reduce the set-back to a minimum.

Thus the present invention proposes the use of a floating or movable ring about the tree trunk which is sized to have the open interior of the ring in the area in which the tree resides sized sufficiently large to allow the ring and thus its exterior wall to be move toward the tree a distance equal to at least the mower set-back. This proposed ring is unattached to anything, has the rounded or smooth bottom edge so it can slide on a surface, and is made of tough material so it can be abutted with the lawnmower to push it toward and from the tree trunk as the ring is mowed around. Preferably the ring open interior is large enough to allow the ring to move 2 to 4 times (or more) the mower set-back, as this will allow faster mowing due to a lower accuracy requirement of placement of the lawnmower, and will also allow different makes of lawnmowers, such as may be used by a large landscaping crew, which most likely have slightly varying set-backs to be used in a given arrangement of a ring about a tree. The preferred larger clear interior diameter of the ring simply is more forgiving and allows for greater flexibility. The space between the ring interior surface and the tree trunk, may be referred to as the mowing clearance. After mowing completely about the tree trunk and ring, wherein the ring has been pushed back and forth about the trunk as the mower moved completely about the tree abutting the ring, the displaced ring is then again centered about the tree trunk by hand or by simply tapping it by foot without having to bend over. The centering of the ring about the tree after mowing helps shade a pattern on the ground surrounding the tree trunk, and as will be further detailed, this shading of the area helps slow the growth of vegetation between the ring and the tree trunk. When mowing about the ring and tree trunk, the front and either side of the mower may be used to abut and push the ring.

The ring is preferably made of opaque material and of about four inches in height so as to block a significant amount of sunlight from striking the ground about the tree trunk, and to also serves as a visual indicator of the height of the grass. The ring is structured to extend upward to a height sufficient to protect the trunk of the tree from damage by these outermost portions of the lawnmower, particularly the wheels and blade shroud. The ring is fairly rigid so that when struck by the lawnmower, the entire ring moves, as opposed to just bending in the struck area.

The ring is also preferably somewhat heavy, or at least not structured with the intent to render it as light as is possible, as the weight helps prevent the normally horizontal ring from bouncing up or flying into the air too much when struck by a mower so that it remains down on the ground between the mower and the trunk of the tree. The weight of the ring additionally helps prevent tender, young and thus delicate grass from growing in the mower clearance area, i.e., the area between the interior side of the ring and the tree trunk. This is brought about the ring sliding back and forth on the previously cleared ground as it is struck by the lawnmower, with the sliding causing what is in effect a scrapping across the soil, with this scrapping helping dislodge and prevent young and delicate grass and weeds from taking hold in the previously cleared soil. While the ring is pushed back and forth about the tree trunk, the ring moves closer to the trunk on one side of the trunk, and further from the trunk on the opposite side which requires the ring to slide across the normally mature and thus tough and durable lawn growing in the outer boundaries of the perimeter about the clear ground area, and I have not found that the present ring significantly damages this mature and relatively tough grass.

To install the ring about a tree trunk or like vertical member extending from the ground, the lawn and or weeds should first be removed in a pattern about the tree trunk, the pattern being commensurately sized and shaped for the ring to be applied, and since the preferred ring is circular, this equates to the cleared pattern being circular for the preferred ring. The cleared area about the tree trunk is for leaving bare ground sized about the same or slightly larger in diameter than the ring exterior diameter. The ring should be used as a template for this ground clearing operation. Once the ground has been cleared, then the ring, if it is not already about the tree for use as a ground clearing template, is opened at a split and placed around the tree, and the ring opening is secured shut. The ring may be centrally placed about the tree and left in place during and after the ground clearing operation. Alternatively, the ring may be placed centrally about the tree, the ground marked showing the diameter of the ring, the ring removed and the ground cleared, followed by placing the ring centrally about the tree in the now cleared area.

The height of the ring is around four inches, but could be less or more, and could be substantially more, although excessive height may render the ring unsightly in an ornamental lawn setting in some people's opinion. The vertical extension of the wall of the ring is in any case short, so that an excessive amount of material is not used to define the ring, so that the ring is not too heavy, and so that the ring does not extend upward so far as to be unsightly, and I do not foresee the wall height ever exceeding 12 inches in a lawn setting, and a range of 3 to 7 inches in height will be most common. The ring is structured to extend above the height of a freshly mowed lawn which is generally between two to three inches, and above the height of the outermost portions of the lawnmower which are likely, if the ring is not used, to first contact the tree trunk in close mowing about the trunk. The opaque nature and approximate four inch height of the ring also helps to discourage the growth of grass inside the interior of the ring adjacent the tree trunk by blocking a significant amount of sunlight. The low angled rays of the sun in the morning and evening are generally blocked by the ring's opaque wall with overhead directed sun rays being typically blocked by the leaves of the tree. The desired shading aspect of the ring, and its not too high vertical extension somewhat dictates that the ring not be too large in diameter relative to the tree about which the ring is placed, as it can be appreciated that a ring having a diameter of 36 inches and 4 inches in height, when placed about a tree trunk diameter of 3 inches will not provide much if any shade from low angled sunlight at the meeting of the tree trunk and ground surface. Thus, and for example only, an 8 or 10 inch diameter ring might be more appropriately sized for a 3 inch diameter tree trunk provided the mower set-back is such to allow the ring to be pushed sufficiently toward the trunk as explained above. One mathematical formula for determining the minimum open interior diameter of the ring is as follows: the diameter of the tree trunk adjacent the ground added to two times the set-back of the lawnmower; and this added to the thickness of the vertical wall of ring. This formula will determine the minimum open interior diameter of a circular ring placed about a circular tree trunk, but it would be wise to size the open interior larger than this since the tree trunk will increase, and sometimes rapidly so, with growth, and the larger size will also allow for using differing makes of lawnmowers which will have varying blade set-backs.

The rings in accordance with the present invention can be removed and replaced with larger rings in accordance with the invention as the tree trunk significantly increases in diameter.

Therefore, the height, opaque nature, and diameter of the ring also helps prevent or significantly slow the growth of grass next to the tree trunk, and this being coupled with the scrapping of the ring across the cleared area when the ring is pushed about the tree by a lawn mower is particularly effective at helping keep the cleared area free of significant vegetation growth. A benefit of this lack of vegetation growth in the cleared area is the general elimination, for at least an extended period, of time consuming secondary processes to eliminate nutrient consuming and unsightly tall vegetation growth against the tree trunk.

The ring may be colored or decorated to provide an even more aesthetically appealing look. The decoration may include printed or embossed flowers or designs, or even various colors. The ring or mowing template is also provided in varying sizes ranging from 8 to 36 inches in incremental increases of 6 inches to accommodate various sizes of tree trunks, however these sizes are for example only and may be altered within the scope of the invention.

For the purposes of this disclosure, the term "perimeter" is defined as the area of a ring exterior wall surface when placed about a tree and outward at least a distance therefrom (outward of the ring exterior surface) equal to the lawnmower set-back, and then back inward to the tree trunk, completely about the ring and tree trunk. Clearly disclosed herein is a novel and useful method of vegetation control in the "perimeter" surrounding the trunk of a tree or like vertical member extending from the ground, with the outer boundaries of the perimeter generally defined as in the previous sentence. This definition of "perimeter", from one view point, in part assumes that if the placed ring were immovable as in the prior art, and the area which would require secondary processes besides the use of a wheeled lawnmower to control vegetation growth would be from the outer most edge of the mower set-back outside of the ring (the nearest one could mow to the exterior surface of the ring), and inward therefrom to the tree trunk. A perimeter if no ring were placed on the ground bounding the tree trunk, would be the outer diameter of the mower set-back to the tree trunk completely about the trunk.

It should be noted that the clearing of the ground within the ring adjacent the tree trunk is preferred to help prevent grass from growing tall directly and tightly against the tree trunk. However, the ring can simply be placed about the trunk of the tree absent the ground clearing step, and the ring in this application would simply provide a protective barrier between the lawnmower and the tree trunk during mowing as close as possible about the ring and trunk with the ring pushed tightly to the tree trunk and moving back and forth as the tree and ring are mowed around.

BEST MODES FOR CARRYING OUT THE INVENTION

Figure 1:
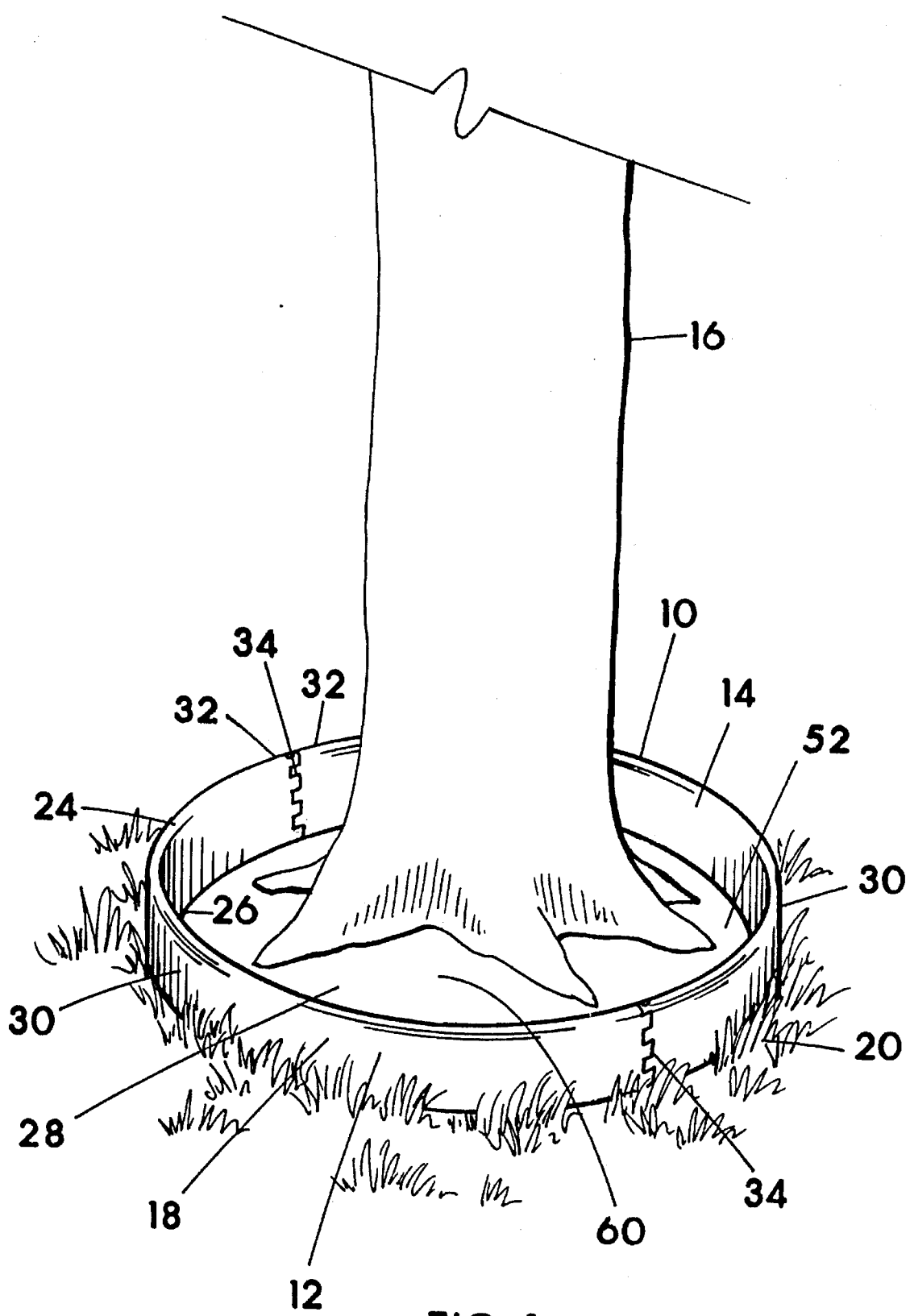
FIG. 1 is an in-use view of a tree protective mowing template or ring in accordance with the present invention showing a perimeter about the tree trunk including the cleared bare earth inside the circular ring and the lawn growing adjacent the outer surface edge of the ring in the outer boundaries of the perimeter.

The tree protective mowing template or ring and method of vegetation control in the perimeter area surrounding the trunk of a tree or like vertical member extending from the ground in accordance with the present invention will now be further detailed with reference to the drawings. Ring or mowing template 10 includes a ring or band of generally rigid material, such as corrosion resistant and (ultra-violet light) U.V. stabilized plastics for durability outside, defining a thin, short substantially vertical sidewall 12 of about four inches in height. The cross sectional thickness of sidewall 12 will normally be between ¼ and ½ inches, although it could be more or less depending upon the material used to define the sidewall 12, and the diameter of the ring 10. ABS and PVC and other types of U.V. stabilized plastics may be used to define ring 10 using processes such as injection molding, extrusion with some secondary operations, blow, rotational and thermoform molding may also be useful. The use of a metal, wood or composite material to define ring 10 is not outside of the invention, although plastics seem ideal for numerous clear reasons pertaining to economics, durability, and weight in handling and shipping. Another reason plastics are the preferred material from which to manufacture the ring 10, or at least the main body thereof, is for safety, in that if the mower blade ever somehow engages the ring 10, if the ring 10 is made of plastics, it is unlikely the plastics will shatter and be thrown at a high velocity as small pieces from the mower, and additionally the blade will not be seriously damaged. Thus the plastics used to define the ring 10 should also be shatter resistant.

The ring 10 sidewall 12 includes an interior surface 14 which faces tree 16 and an oppositely disposed exterior surface 18 which faces the lawn or grass 20. Exterior surface 18 is preferably slightly convexed or bowed outward to help provide greater rigidity while using less material. Exterior surface 18 may also include decorative images 22 or patterns, such as flowers, for aesthetic appeal. Mowing template or ring 10 also includes a narrow upper edge 24 and an oppositely disposed bottom edge 26, both of which are preferably rounded to help reduce friction and slide easier on the ground and grass 20, and at the upper edge 24 so that if somebody falls on the ring they won't get cut. The circular interior space 28 of ring 10 is defined by interior surface 14 of sidewall 12.

Figure 2:
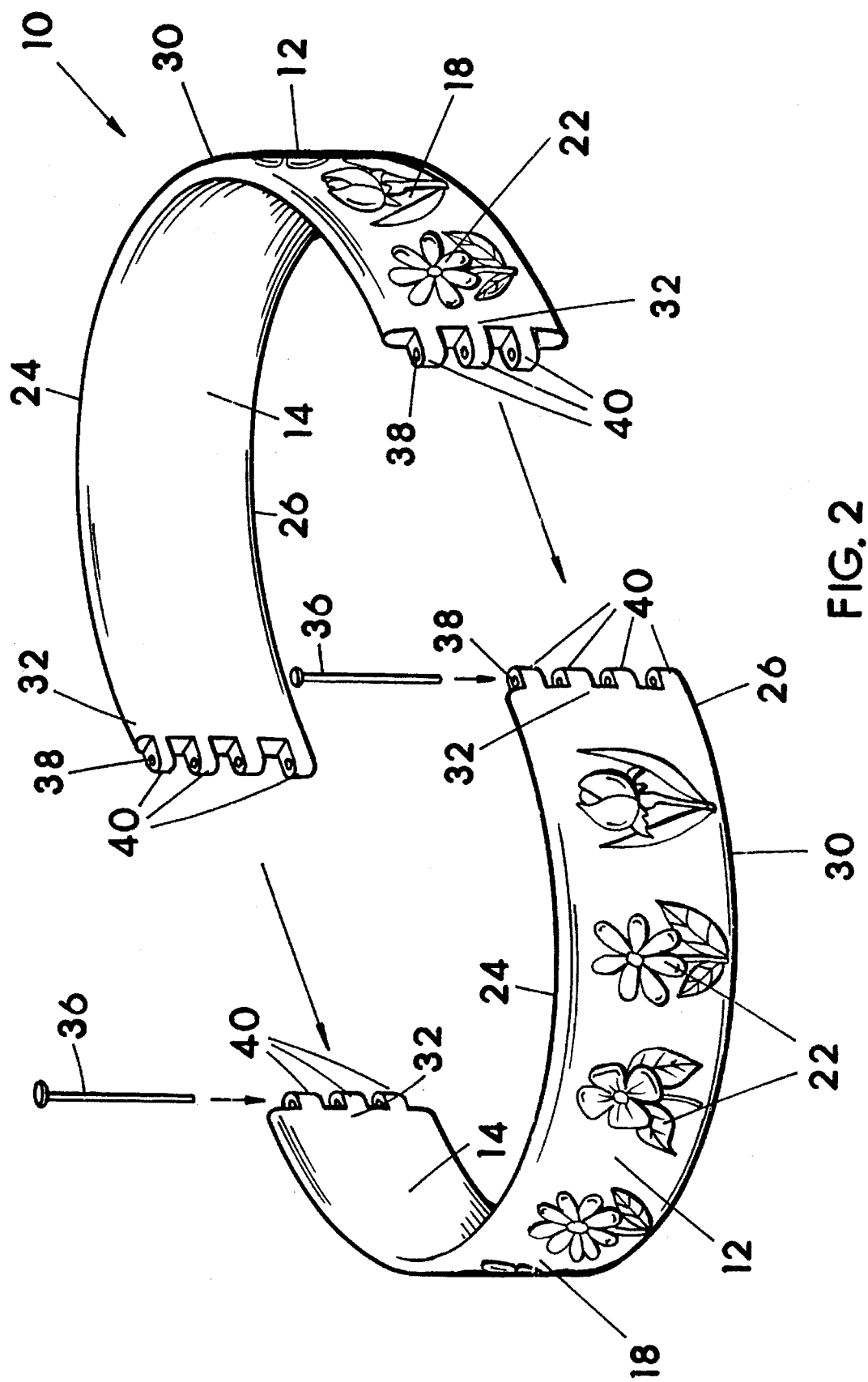
FIG. 2 is a top perspective view of an embodiment of the tree protective mowing ring in accordance with the present invention showing the ring manufactured in two identical sections. The sections are connectable by a slip-pin hinge or lock arrangement.
Figure 3:
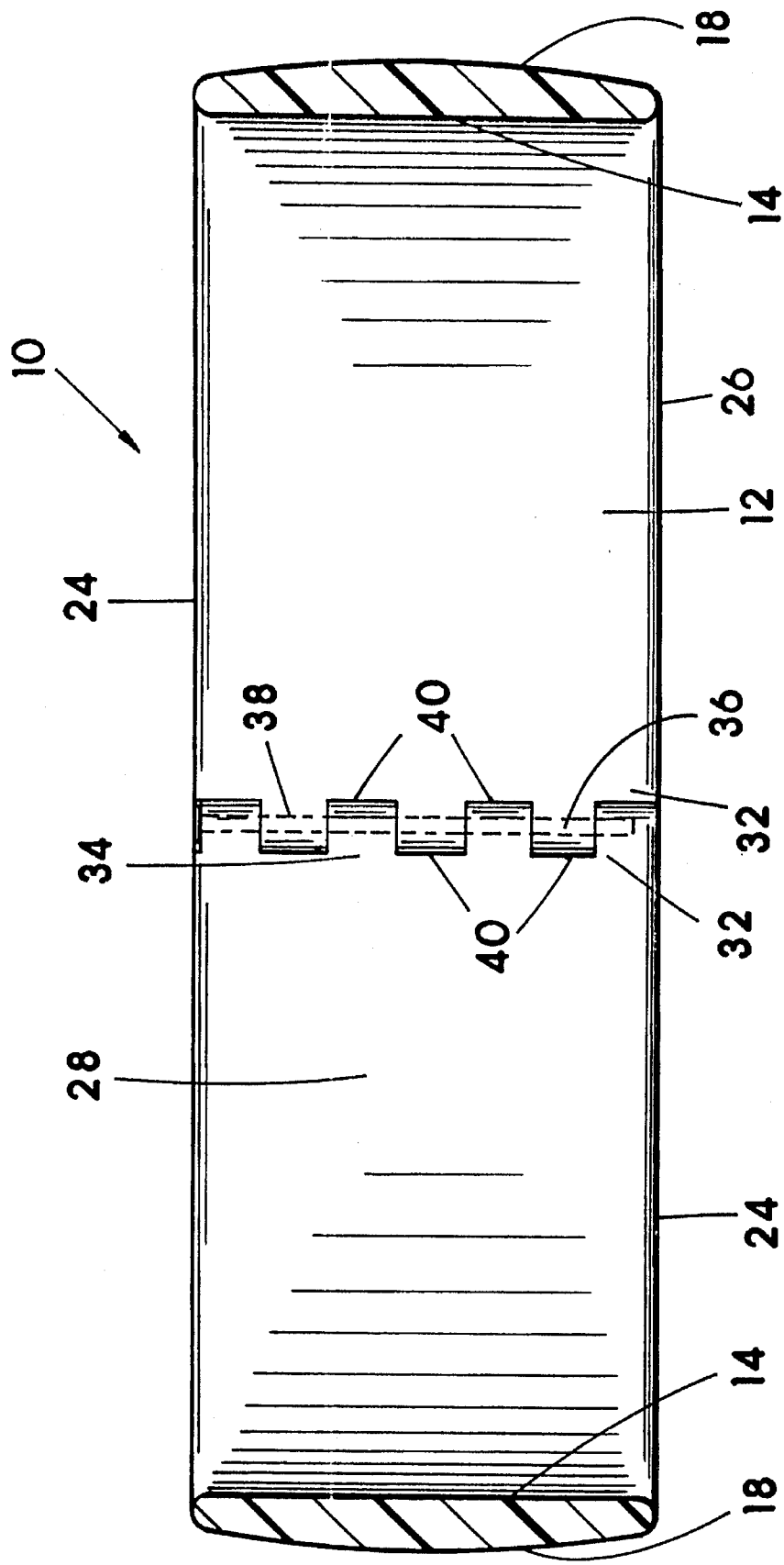
FIG. 3 is a cross-sectional side view of the embodiment of FIG. 2 showing the slip-pin, shown in broken lines, inserted into the aligned apertures of the mating barrels of the assembled hinge or lock arrangement.
Figure 4:
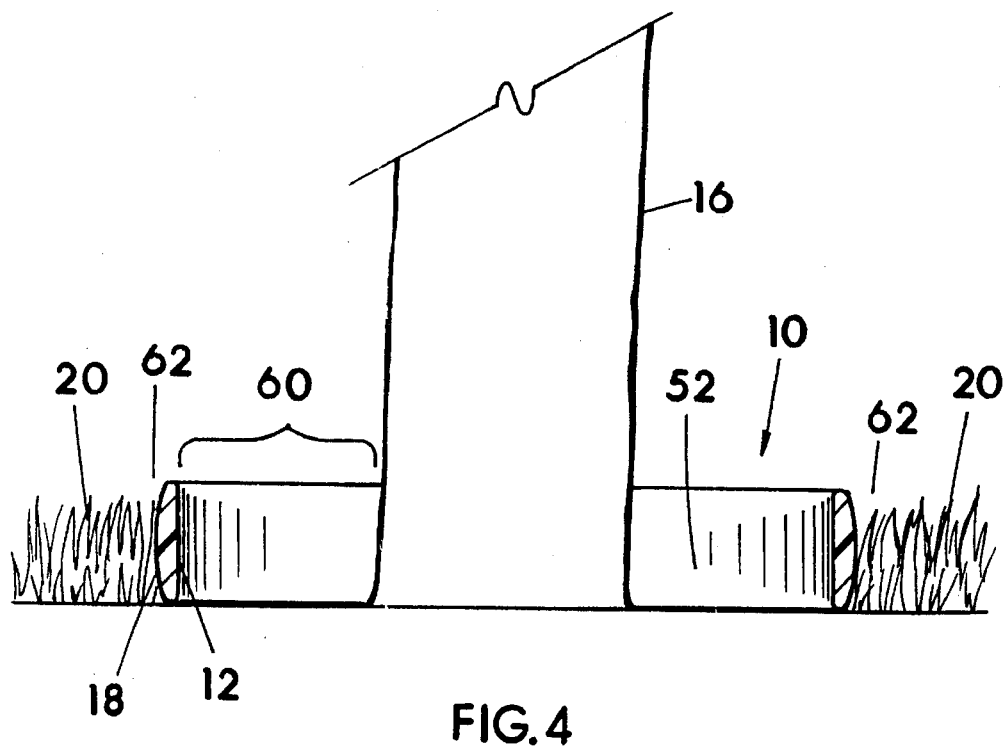
FIG. 4 is a cross-sectional side view of a tree protective mowing ring in accordance with the present invention positioned about a tree trunk and resting horizontally on the ground with the tree centered within the ring and perimeter. The outer boundaries of the perimeter are shown to include growing grass (lawn).
Figure 5:
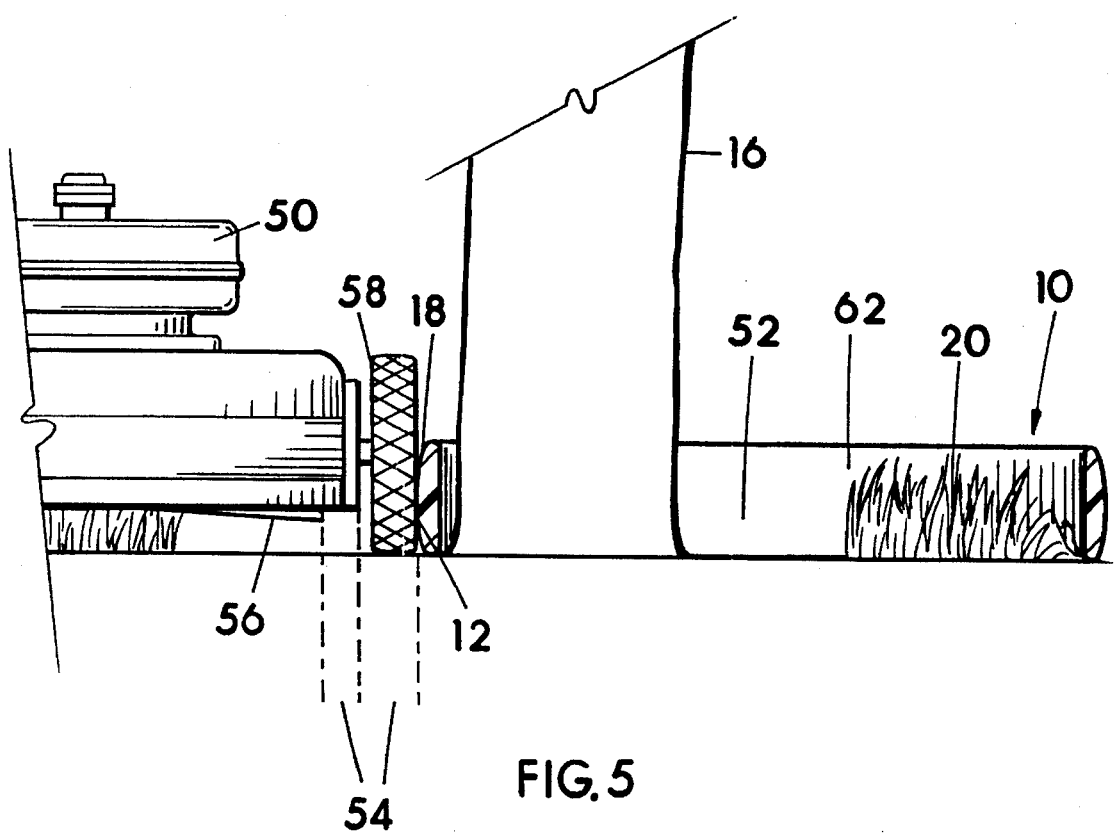
FIG. 5 illustrates the tree protective mowing ring of FIG. 4 displaced by the wheel of the lawn mower and abutting the trunk of the tree. Three vertical broken lines indicate two mower set-back distances, one from the wheel to the blade end, and the second and narrower one from the blade shroud to the blade end adjacent the tree ring. The grass growing in the outer boundaries of the perimeter is shown being mowed.

One embodiment of ring 10 is provided in two separate semicircular sections 30 which are connected prior to the ring being abutted by a lawnmower. Each section 30 has two terminal ends 32 which are adapted for releasable connection to one another, such as with a snap-together connection or a slip-pin arrangement as shown in the drawings. The slip-pin arrangement includes interlocking mating hinges 34 inherently incorporated into both terminal ends 32, with a removable metal or plastic pin 36 sized for insertion into the central shaft 38 of the interlocking individual hinge barrels 40 which make up hinges 34. The exterior surfaces of the hinge barrels 40 are rounded to allow pivoting of the hinge joint. The slip-pin arrangement allows for removal of pin 36 from two terminal ends 32 or one mating hinge 34 to allow access to the interior space 28 of ring 10 for placement around tree 16, while the remaining hinge 34 simply functions as a hinge. Each section 30 can be manufactured as an identical unit, with each terminal end 32 adapted for interlocking connection into the terminal end 32 of a second identical unit. This is illustrated in FIG. 2 with the left terminal end 32 of the left section 30 of ring 10 having three hinge barrels 40 and the right terminal end 32 thereof having four hinge barrels 40. Thus the hinge barrels 40 of one section 30 will mate with an identical section 30 as shown. It should be noted that the hinges 34 do not necessarily need to function as pivotal hinges, but can simply serve as a disconnectable engagement arrangement.

Figure 6:
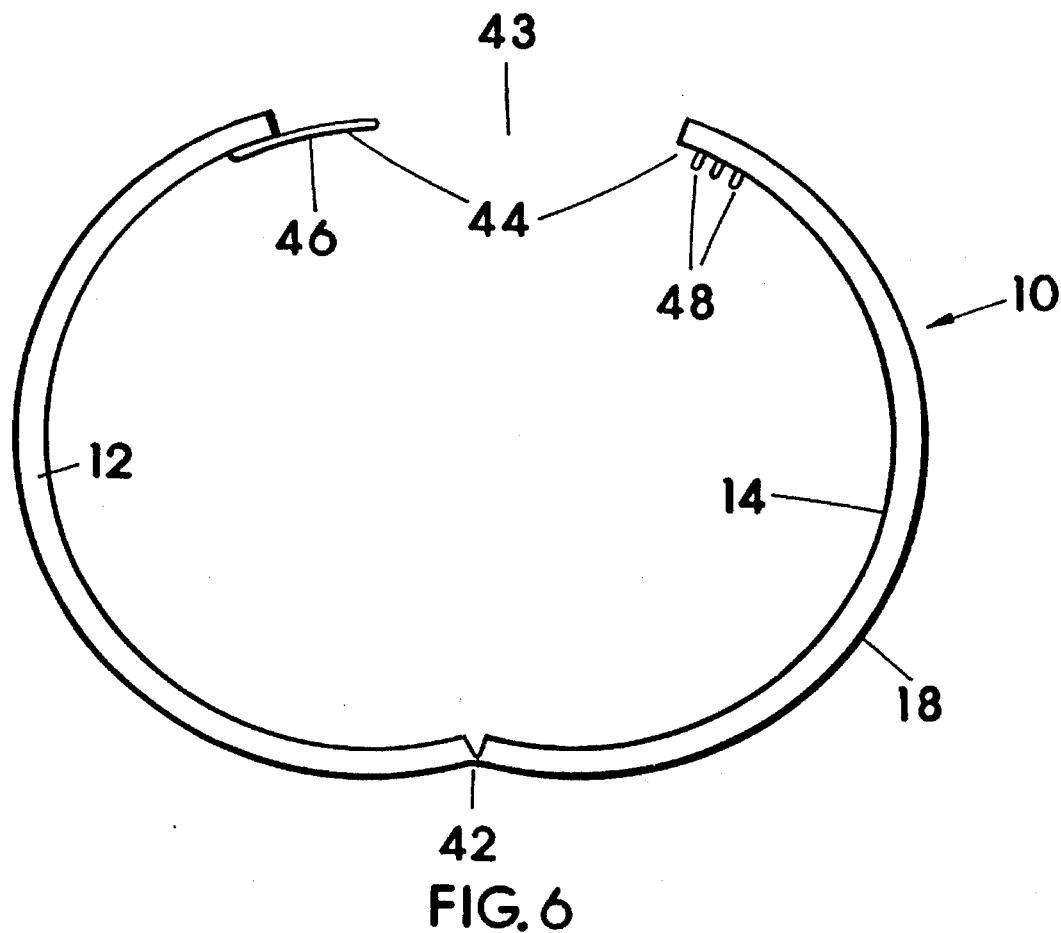
FIG. 6 is a top plan view of another embodiment of tree protective mowing ring in accordance with the present invention showing a living hinge and a clasp type closure. The closure is shown positioned on the inside of the ring to avoid damage or unintentional release by the wheel of the lawn mower.
Figure 7:
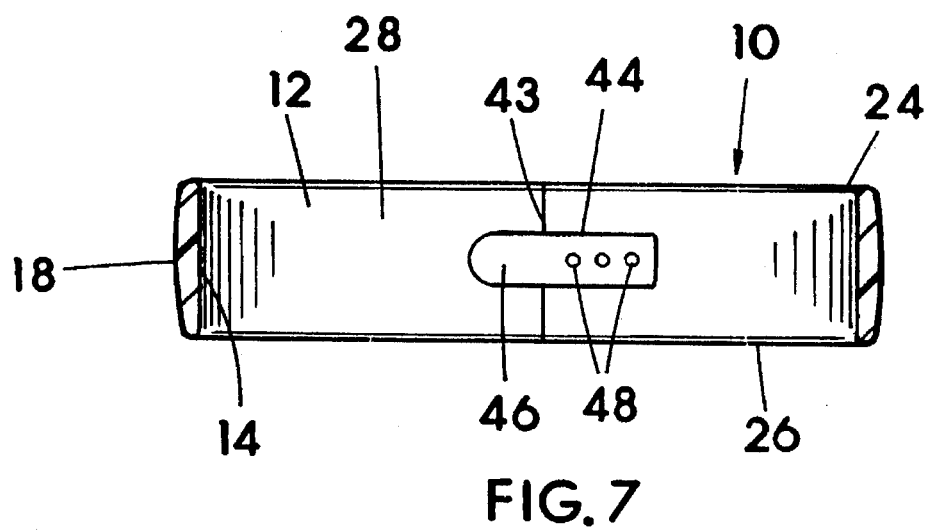
FIG. 7 is a cross-sectional side view of the ring embodiment of FIG. 6 in the closed and locked position.

In another embodiment of ring 10, shown in FIG. 6 and 7, there is a vertical slit or opening 43 for passage around tree 16 and a V-groove which forms a living hinge 42. The fastener for closing opening 43 includes a snap connector 44 which is made up of an inherent semi-flexible strap 46 affixed to one terminal end 32 with apertures which are snapped over small pins 48 which are located on the opposite terminal end 32. Both strap 46 and pins 48 are preferably affixed to interior surface 14 of ring 10 to avoid interference by lawnmower 50 which may inadvertently accidentally open snap connector 44 or damage it.

A simpler embodiment of the ring may merely include a more flexible ring 10 having a single vertical slit. The low degree but sufficient flexibility of the material of ring 10 would allow the slit to be opened for placement of ring 10 around tree 16.

To utilize mowing ring 10, the lawn or grass 20 round the base of tree 16 is first removed in a circular pattern, leaving tree 16 centrally positioned therein. The lawn and or weeds should first be removed in a circular concentric pattern about the tree trunk, leaving bare ground sized slightly larger in diameter than the ring 10. Ring or template 10 should be used as a template for this ground clearing operation. Once the ground has been cleared, then the ring, if it is not already about the tree for use as a ground clearing template, is opened and placed around the tree, and the ring opening is secured shut. The ring or template 10 may be centrally placed about the tree and left in place during and after the ground clearing operation. Alternatively, the ring or template 10 may be placed centrally about the tree, the ground marked showing the interior diameter of the ring, the ring 10 removed and the ground cleared, followed by placing the ring centrally about the tree in the now cleared area. The ground beneath grass 20 should not be significantly removed in the clearing process, as this would leave a depression which would recess ring 10 too low in relation to the top of the lawn, and render it difficult to push the ring 10 back and forth around the tree. The size of the circular pattern of the bare area 52, depends on the diameter of ring 10, which in turn is primarily dependant on the diameter of tree 16. Mowing ring or template 10 must be large enough to provide mowing clearance 60 which is either equal to or slightly larger than the set-back 54 of lawnmower 50 to assure grass line 62 adjacent bare area 52 is mowed. The set-back 54 of lawnmower 50 is generally defined as the space between the edge of cutting blade 56 and the outermost part of the lawnmower 50, which for most makes and models of lawnmowers are the wheels and blade shroud, which results in an un-mowed strip on the edge of the lawnmowing path. The set-back 54 is an area which blade 56 can not reach and any grass 20 lying in this area does not get mowed by lawnmower 50 which generally necessitates the use of a grass or edge trimmer. Therefore the diameter of ring 10 must allow for a minimum space between tree 20 and ring 10, referred to as mowing clearance 60, to be at least equal to or greater than the set-back 54 of lawnmower 50 to allow sufficient clearance for the wheels 58 and or side of lawnmower 50 within bare area 52. This allows cutting blade 56 to slightly extend into bare area 52 to ensure cutting of grass line 62. Ring 10 should not be too large relative to the tree trunk either, as this will allow an excessive amount of sunlight to strike the bare area 52 which would promote grass growth.

After the ground has been cleared around the trunk of the tree and the ring 10 is placed in the cleared area, the grass can be mowed around the ring 10 and tree whenever needed. As lawnmower 50 abuts exterior surface 18 of mowing ring 10, the force of the mower easily pushes mowing ring 10 out of position and towards tree 16. The blade shroud side or wheels 58 of lawnmower 50 can press against ring 10 while circling tree 16 with ring 10 pivoting about tree 16 and protecting it from damage. As the ring 10 is moved about the tree, it scraps the ground in the clear area adjacent the trunk and dislodges any new grass starts, thus helping to maintain the area clear and free of vegetation growth. This scrapping effect particularly when coupled with the opaque sun blocking nature of the ring 10 is highly effective at keeping the clear area generally free of vegetation growth, and in the very least greatly slowing the re-growth of grass and weeds in this area. Once grass line 62 adjacent bare area 52 is mowed, ring 10 is replaced to its original position centered about the tree, often just by kicking it back in place by foot. Since ring 10 lies on the ground surface and is not affixed in position in any way, it is simple and easy to move whenever desired.

The height of ring 10 has been suggested at about four inches which would generally make upper edge 24 minimally noticeable above a newly mowed lawn, and some may find the appearance of the ring aesthetically pleasing. When the lawn grows to a height to obscure the view of ring 10 this can be a visual indicator to the homeowner that the lawn now needs mowing.

It should be noted that although ring 10 and the bare area 52 have been described as circular in shape, it would not be outside of the invention for ring 10 to be oval or rectangular in shape, and bare area 52 commensurately sized and shaped, although I prefer circular for smoother functioning and improved appearance.

Although I have very specifically described the best modes for carrying out the invention, it should be understood that changes in the specifics given and shown may clearly be made without departing from the true scope of the invention in accordance with the appended claims.

What I claim as my invention:

1. A method of controlling vegetation growth within a perimeter about a tree trunk in a lawn setting, comprising the steps of:
   (a) placing a ring defining a vertical wall unattached and resting on the ground and encircling the tree trunk;
   (b) clearing vegetation from the ground within said ring up to the tree trunk;
   (c) mowing about the exterior surface of said ring and outer boundaries of said perimeter with a wheeled lawnmower, and pushing said ring with outermost portions of the lawnmower toward the tree trunk at least a distance equal to a blade set-back of the lawnmower while mowing about the ring and while mowing the outer boundaries of said perimeter;
   (d) relocating said ring within the vegetation cleared ground area.

2. A method of controlling vegetation growth about a tree trunk, comprising the steps of:
   (a) placing a ring defining a short vertical wall unattached and resting on the ground and encircling the tree trunk with the tree trunk approximately centered within said ring;
   (b) mowing about the entire exterior surface of said ring with a wheeled lawnmower, and pushing said ring with outermost portions of the lawnmower toward the tree trunk at least the distance equal to a blade set-back of the lawnmower while mowing about the ring;
   (c) relocating said ring to approximately center the tree trunk within the ring.

3. A method of controlling vegetation growth about a tree trunk, comprising the steps of:
   (a) clearing vegetation from the ground about the tree trunk;
   (b) placing a ring defining a short vertical wall unattached and resting on the ground and encircling the tree trunk with the tree trunk approximately centered within said ring;
   (c) mowing about the entire exterior surface of said ring with a wheeled lawnmower, and pushing said ring with outermost portions of the lawnmower toward the tree trunk at least the distance equal to a blade set-back of the lawnmower while mowing about the ring;
   (d) relocating said ring to approximately center the tree trunk within the ring.

4. A tree having a trunk of a particular diameter growing in the earth and a protective mowing template placed about said tree and resting loosely on the earth about said tree trunk unattached and capable of sliding on the earth toward and away from the tree trunk while being pushed by a wheeled lawn mower, said tree protective mowing template comprising: a generally rigid ring made of plastics material and defining a vertical outside wall having a height adapted to engage the blade protecting housing of a lawn mower; said plastics material being of a type which is shatter resistant and having sufficient strength and thickness whereby the entire ring may pushed about on the earth surface by a lawn mower without breaking;

at least one break in the vertical outside wall of the ring for allowing said ring to be opened sufficiently to pass about a tree trunk through the open break and into an open interior of the ring and a locking means for securing said at least one break in a closed position;

said ring having an open interior diameter at least equal to the total of the diameter of the tree trunk adjacent the ground plus two times a lawn mower set-back added to the thickness of the vertical wall of said ring;

said ring having a smooth bottom edge for allowing the bottom edge to slide over obstacles.

* * * * *